(12) United States Patent
Takano et al.

(10) Patent No.: US 6,919,969 B1
(45) Date of Patent: Jul. 19, 2005

(54) METHOD AND APPARATUS FOR PROCESSING (75) Inventors: Gaku Takano, Yokohama (JP); Eiichi Sakaue, Tokyo-To (JP)

(73) Assignees: Kabushiki Kaisha Toshiba, Kawasaki (JP); Toshiba Tec Kabushiki Kaisha, Tokyo-to (JP)

( * ) Notice: Subject to any disclaimer, the term of this patent is extended or adjusted under 35 U.S.C. 154(b) by 1004 days.

(21) Appl. No.: 09/696,738

(22) Filed: Oct. 26, 2000

(51) Int. Cl.[7] ............................. H04N 1/52; H04N 1/58
(52) U.S. Cl. .................. 358/1.9; 358/3.24; 358/3.26; 358/533; 358/534
(58) Field of Search ..................... 358/1.9, 3.24, 358/3.26, 533–536

(56) References Cited

U.S. PATENT DOCUMENTS 4,974,067 A * 11/1990 Suzuki et al. ............... 358/534

FOREIGN PATENT DOCUMENTS

| JP | 64-56553 A | * | 3/1989 | .......... G06K/15/00 |
| JP | 2001-45306 A | * | 2/2001 | ............ H04N/1/52 |
| JP | 2002-165107 A | * | 6/2002 | ............ H04N/1/60 |

* cited by examiner

Primary Examiner—Scott A. Rogers
(74) Attorney, Agent, or Firm—Foley & Lardner LLP (57) ABSTRACT

The tincture of an input image is analyzed, and stable, smooth screen angles are assigned in descending order from the most dominant color. When the input image has dot information, like a print, the two-dimensional frequency components of the input image for C, M, Y, and K are analyzed, screen angles and frequencies which do not interfere with these components are analyzed, and various textures are assigned to the respective colors on the basis of the analysis result. Accordingly, an image which is stable and smooth in tone and excellent in color reproducibility can be output.

18 Claims, 10 Drawing Sheets

METHOD AND APPARATUS FOR PROCESSING

BACKGROUND OF THE INVENTION

An image printing apparatus such as a printing apparatus, printer, or copying machine using a plurality of ink plates, e.g., Y (Yellow), M (Magenta), C (Cyan), and K (black) ink plates often prints respective images with different textures in order to prevent interference between the ink plates. The texture means lines, dither, and dots generally used in the image printing apparatus.

As a method of changing the texture, e.g., the angle of the texture is changed to Y=0°, M=15°, C=75°, and K=45° for the respective ink plates without changing the period. As another method, not only the angle but also the frequency is changed.

However, changing the frequency or angle of the texture generates a difference in density stability, smoothness, or granular noise depending on the characteristics of an image processing apparatus.

For example, for lines, a line having an angle of 90° i.e., vertical line is resistant to jitter noise (generated by paper feed nonuniformity or the like) having a noise component perpendicular to the vertical line. To the contrary, an almost horizontal line is susceptible to this jitter noise.

If a texture poorest in characteristics (most susceptible to noise) is assigned to the most dominant tincture in an input original (e.g., M (Magenta) dominant over the flesh color in a figure image), the entire image quality degrades.

In many cases, an original input to the image processing apparatus has a texture when the input original is created by the image processing apparatus. In this case, the texture of the input original and that of an image output from the image processing apparatus interfere with each other to generate moiré fringes.

SUMMARY OF THE INVENTION

It is an object of the present invention to provide an image processing apparatus capable of preventing generation of moiré or the like, and increasing the image quality.

An image processing apparatus according to the present invention comprises a printing signal decomposition unit for receiving an input image signal and decomposing the input image signal into a plurality of color ink signals, a tincture analysis unit for analyzing a tincture of the input image using the color ink signals, determining dominant priorities of the color ink signals, and outputting ink priority signals, a texture management unit for assigning texture priorities to a plurality of printing textures in accordance with the ink priority signals, and a texture assignment unit for assigning the printing textures in descending order of the texture priorities to the color ink signals in descending order of the dominant priorities.

According to the present invention, since a texture highest in characteristics is assigned to a plate of the most dominant ink signal in an input original, a high-quality image can be output.

An image processing apparatus according to the present invention comprises a printing signal decomposition unit for receiving an input image signal and decomposing the input image signal into a plurality of color ink signals, a frequency analysis unit for analyzing a dominant two-dimensional frequency component of the input image using the color ink signals, a texture management unit for managing fundamental frequency components of a plurality of printing textures, and a texture assignment unit for assigning the printing textures to the color ink signals on the basis of the two-dimensional frequency component and the fundamental frequency components of the printing textures.

Since a texture which does not interfere with the frequency of an input original is assigned in accordance with this frequency, generation of moiré or the like can be prevented.

An image processing method according to the present invention comprises the step of receiving an input image signal and decomposing the input image signal into a plurality of color ink signals, the step of analyzing a tincture of the input image using the color ink signals, determining dominant priorities of the color ink signals, and generating ink priority signals, the step of assigning texture priorities to a plurality of printing textures in accordance with the ink priority signals, and the step of assigning the printing textures in descending order of the texture priorities to the color ink signals in descending order of the dominant priorities.

Further, an image processing method according to the present invention comprises the step of receiving an input image signal and decomposing the input image signal into a plurality of color ink signals, the step of analyzing a dominant two-dimensional frequency component of the input image using the color ink signals, the step of managing fundamental frequency components of a plurality of printing textures, and the step of assigning the printing textures to the color ink signals on the basis of the two-dimensional frequency component and the fundamental frequency components of the printing textures.

BRIEF DESCRIPTION OF THE DRAWINGS

In the accompanying drawings.

DESCRIPTION OF THE PREFERRED EMBODIMENTS

The schematic whole internal arrangement of an image processing apparatus to which the present invention can be applied will be described with reference to FIG. 1.

The image processing apparatus is, e.g., a digital color copying machine for reading a color image on an original, and forming and outputting a copy image. This apparatus roughly comprises a color scanner section 1 serving as an image reading means for reading and inputting a color input original on an original, and a color printer section 2 serving as an image formation means for forming a copy image of the color input original.

The color scanner section 1 has an original table cover 3, and an original table 4 formed from a transparent glass which faces the closed original table cover 3 and supports an input original. An exposure lamp 5 for illuminating an original set on the original table 4, a reflector 6 for condensing light from the exposure lamp 5 to an original, and a first mirror 7 for deflecting light reflected by the original leftward in FIG. 1 are arranged below the original table 4.

The exposure lamp 5, reflector 6, and first mirror 7 are fixed to a first carriage 8. The first carriage 8 is driven by a pulse motor (not shown) via a toothed belt (not shown) or the like to move parallel to the lower surface of the original table 4.

Figure 1:
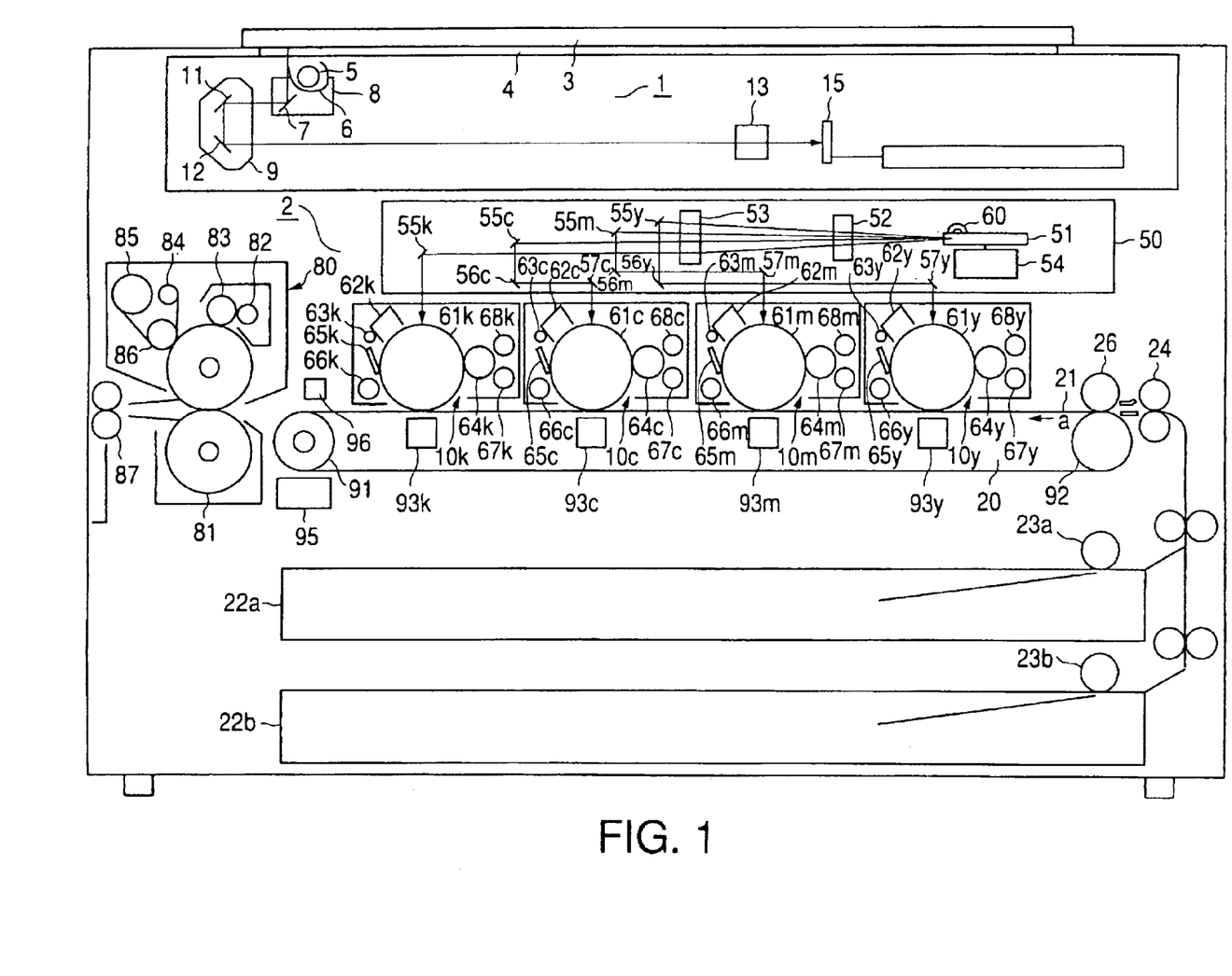
FIG. 1 is a longitudinal sectional view schematically showing the whole internal mechanism of an image processing apparatus to which the present invention can be applied.

A second carriage 9 movable parallel to the original table 4 via a driving mechanism (not shown; e.g., a toothed belt and DC motor) is disposed in a direction in which light reflected by the first mirror 7 on the left in FIG. 1 is guided with respect to the first carriage 8. A second mirror 11 for deflecting downward in FIG. 1 the light that is reflected by the original and guided by the first mirror 7, and a third mirror 12 for deflecting rightward in FIG. 1 the light reflected by the second mirror 11 are arranged at right angles on the second carriage 9.

The second carriage 9 operates following the first carriage 8, and moves parallel to the original table 4 at a speed ½ that of the first carriage 8.

An imaging lens 13 for forming light reflected by the third mirror 12 into an image at a predetermined magnification is arranged in a plane containing the optical path of the light deflected by the second and third mirrors 11 and 12. A CCD color image sensor (photoelectric conversion element) 15 for converting the reflected light focused by the imaging lens 13 into an electrical signal is disposed in a plane substantially perpendicular to the optical path of the light having passed through the imaging lens 13.

When light emitted by the exposure lamp 5 is focused on an original on the original table 4 via the reflector 6, the light reflected by the original is incident on the color image sensor via the first mirror 7, second mirror 11, third mirror 12, and imaging lens 13. The sensor 15 converts the incident light into R, G, and B signals.

The color printer section 2 has first, second, third, and fourth image formation sections 10y, 10m, 10c, and 10k for generating image signals separated into respective color components Y, M, C, and K on the basis of a known subtractive mixing method.

A convey mechanism 20 including a convey belt 21 serving as a convey means for conveying an image of each color formed by each image formation section in a direction a in FIG. 1 is disposed below the image formation sections 10y, 10m, 10c, and 10k. The convey belt 21 is looped at a predetermined tension between a driving roller 91 which is rotated by a motor (not shown) in the direction indicated by the arrow a, and a driven roller 92 apart from the driving roller 91 by a predetermined distance. The convey belt 21 travels endlessly at a predetermined speed in the direction indicated by the arrow a. Note that the image formation sections 10y, 10m, 10c, and 10k are aligned along the convey direction of the convey belt 21.

The image formation sections 10y, 10m, 10c, and 10k respectively comprise, at positions in contact with the convey belt 21, photosensitive drums 61y, 61m, 61c, and 61k serving as image carriers whose outer surfaces are formed rotatably in the same direction. The photosensitive drums 61y, 61m, 61c, and 61k are rotated at a predetermined peripheral speed by a motor (not shown).

The photosensitive drums 61y, 61m, 61c, and 61k are disposed such that their axes are aligned at an equal interval and are perpendicular to a direction in which the convey belt 21 conveys an image.

In the following description, the axial direction of the photosensitive drums 61y, 61m, 61c, and 61k is defined as a main scanning direction (second direction), and the rotational direction of the photosensitive drums 61y, 61m, 61c, and 61k, i.e., the rotational direction of the convey belt 21 (direction indicated by the arrows in FIG. 1) is defined as a subscanning direction (first direction).

The photosensitive drums 61y, 61m, 61c, and 61k are surrounded sequentially along the rotational direction of waste toner recovery screws 66y, 66m, 66c, and 66k by chargers 62y, 62m, 62c, and 62k serving as charging means extending in the main scanning direction, charge removers 63y, 63m, 63c, and 63k, developing rollers 64y, 64m, 64c, and 64k serving as developing means similarly extending in the main scanning direction, lower stirring rollers 67y, 67c, 67m, and 67k, upper stirring rollers 68y, 68m, 68c, and 68k, transfer devices 93y, 93m, 93c, and 93kserving as transfer means similarly extending in the main scanning direction, and cleaning blades 65y, 65m, 65c, and 65k similarly extending in the main scanning direction.

The transfer devices 93y, 93m, 93c, and 93k are located at positions where they clamp the convey belt 21 together with the corresponding photosensitive drums 61y, 61m, 61c, and 61k, i.e., inside the convey belt 21. Exposure points by an exposure device 50 (to be described later) are formed on the outer surfaces of the photosensitive drums 61y, 61m, 61c, and 61k between the chargers 62y, 62m, 62c, and 62k and the developing rollers 64y, 64m, 64c, and 64k.

Sheet cassettes 22a and 22b which store a plurality of sheets P as image formation media (printing media) to which images formed by the image formation section 10k are transferred are arranged below the convey mechanism 20.

Pickup rollers 23a and 23b for picking up the sheets P stored in the sheet cassettes 22a and 22b one by one from the top are arranged at end portions of the sheet cassettes 22a and 22b near the driven roller 92. Registration rollers 24 for registering the leading end of a sheet P picked up from each of the sheet cassettes 22a and 22b with the leading end of a y toner image formed on the photosensitive drum 61y of the image formation section 10y are interposed between the pickup rollers 23a and 23b and the driven roller 92.

Toner images formed on the remaining photosensitive drums 61m, 61c, and 61k are supplied to respective transfer positions in synchronism with the convey timing of the sheet P conveyed on the convey belt 21.

A chuck roller 26 for applying an electrostatic chuck force to the sheet P conveyed at a predetermined timing via the resist rollers 24 is positioned between the resist roller 24 and the first image formation section 10y near the driven roller 92, i.e., substantially on the outer surface of the driven roller 92 via the convey belt 21. The axes of the chuck roller 26 and driven roller 92 are set parallel to each other.

A positional error sensor 96 for detecting the position of a formed image on the convey belt 21 is disposed at an end of the convey belt 21 near the driving roller 91, i.e., substantially on the outer surface of the driving roller 91 via the convey belt 21. The positional error sensor 96 is formed from, e.g., a transmission or reflection type photosensor.

A convey belt cleaning device 95 for removing toner attached to the convey belt 21, paper dust of the sheet P, or the like is arranged on the outer surface of the driving roller 91 and on the convey belt 21 on the downstream side of the positional error sensor 96.

A fixing device 80 is disposed which separates the sheet P conveyed via the convey belt 21 from the driving roller 91, and heats the sheet P to a predetermined temperature in the convey direction to fuse a toner image transferred to the sheet P, thereby fixing the toner image on the sheet P. The fixing device 80 is constituted by a pair of heat rollers 81, oil coating rollers 82 and 83, a web winding roller 84, a web roller 85, and a web press roller 86. The toner applied to the sheet P is fixed to the sheet, and the sheet P is discharged by a pair of discharge rollers 87.

The exposure device 50 for forming color-separated electrostatic latent images on the outer surfaces of the photosensitive drums 61y, 61m, 61c, and 61k has a semiconductor laser oscillator 60 which is controlled to emit light on the basis of image data Y, M, C, and K for the respective colors separated by an image processor 36 (to be described later). A polygon mirror 51 which reflects a laser beam to scan and is rotated by a polygon motor 54, and fθ lenses 52 and 53 which correct the focal point of the laser beam reflected via the polygon mirror 51 and form the laser beam into an image are sequentially arranged along the optical axis of the semiconductor laser oscillator 60.

First deflection mirrors 55y, 55m, 55c, and 55k for deflecting laser beams of respective colors having passed through the fθ lens 53 toward the exposure positions of the photosensitive drums 61y, 61m, 61c, and 61k, and second and third deflection mirrors 56y, 56m, 56c, 57y, 57m, and 57c for further deflecting the laser beams deflected by the first deflection mirrors 55y, 55m, 55c, and 55k are interposed between the fθ lens 53 and the photosensitive drums 61y, 61m, 61c, and 61k.

A laser beam for black is deflected by the first deflection mirror 55k, and then guided to the photosensitive drum 61k without the mediacy of another mirror.

Figure 2:
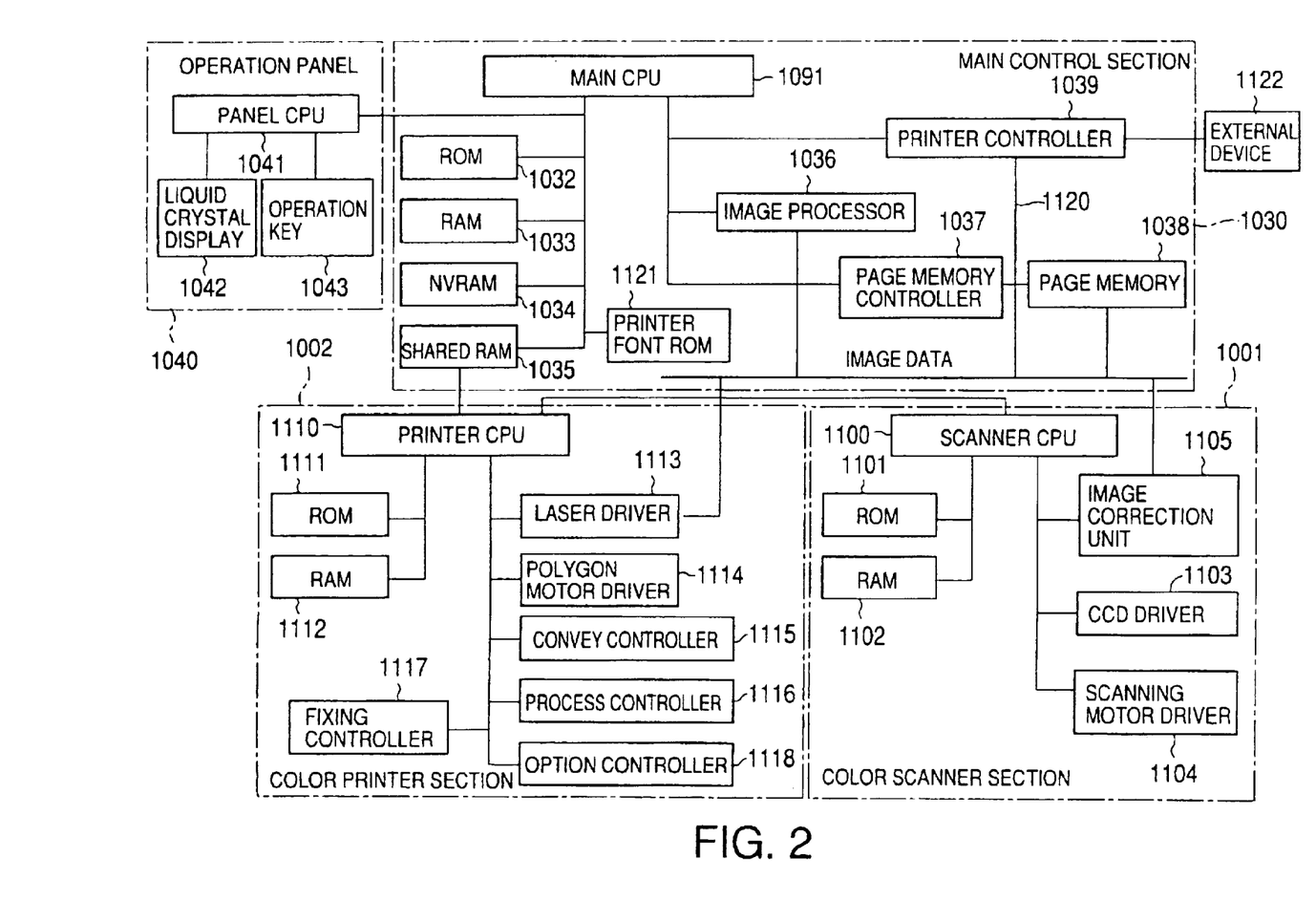
FIG. 2 is a block diagram schematically showing the whole internal circuit of the image processing apparatus.

The circuit arrangement of the image processing apparatus will be explained with reference to FIG. 2. The control system in this circuit is comprised of three CPUs, i.e., a main CPU 1091 in a main control section 1030, a scanner CPU 1100 in a color scanner section 1001, and a printer CPU 1110 in a color printer section 1002.

The main CPU 1091 performs two-way communication with the printer CPU 1110 via a shared RAM 1035. The main CPU 1091 outputs an operation instruction, whereas the printer CPU 1110 outputs status information. The printer CPU 1110 and scanner CPU 1100 serially communicate with each other. The printer CPU 1110 outputs an operation instruction, whereas the scanner CPU 1100 outputs status information.

An operation panel 1040 comprises a liquid crystal display 1042, various operation keys 1043, and a panel CPU 1041 connected to them. The operation panel 1040 is connected to the main CPU 1091.

The main control section 1030 comprises the main CPU 1091, a ROM 1032, a RAM 1033, an NVRAM (NonVolatile RAM) 1034, the shared RAM 1035, an image processor 1036, a page memory controller 1037, a page memory 1038, a printer controller 1039, and a printer font ROM 1121.

The main CPU 1091 performs the whole control. The ROM 1032 records control processes and the like, and the RAM 1033 temporarily stores data.

The NVRAM 1034 is a nonvolatile memory backed up by a battery (not shown), and can hold data even if no power is supplied from the power supply.

The shared RAM 1035 is used to perform two-way communication between the main CPU 1091 and the printer CPU 1110.

The page memory controller 1037 stores and reads out image information in and from the page memory 1038. The page memory 1038 has an area enough to store image information of a plurality of pages, compresses image information from the color scanner section 1001, and stores data in units of pages.

The printer font ROM 1121 stores font data corresponding to print data. The printer controller 1039 generates image data from print data output from an external device 1122 such as a personal computer at a resolution corresponding to data representing a resolution assigned to the print data by using font data stored in the printer font ROM 1121.

The color scanner section 1001 comprises the ROM 1101 for performing the whole control, a ROM 1101 storing control programs and the like, a RAM 1102 for storing data, a CCD driver 1103 for driving the color image sensor (not shown), a scanning motor driver 1104 for controlling rotation of a scanning motor for moving the first carriage (not shown), and an image correction unit 1105.

The image correction unit 1105 has an A/D conversion circuit for converting R, G, and B analog signals output from the color image sensor (not shown) into digital signals, a shading correction circuit for correcting variations in threshold level with respect to an output signal from the color image sensor that are caused by variations in characteristics of the color image sensor or changes in ambient temperature, and a line memory for temporarily storing a corrected digital signal output from the shading correction circuit.

The color printer section 1002 comprises a ROM 1111 storing control programs or the like, a RAM 1112 for storing data, a laser driver 1113 for driving the semiconductor laser oscillator (not shown), a polygon motor driver 1114 for driving the polygon motor of the exposure device (not shown), a convey controller 1115 for controlling conveyance of the sheet P by the convey mechanism (not shown), a process controller 1116 for controlling processes for performing charging, development, and transfer using the charger, developing roller, and transfer device, a fixing controller 1117 for controlling the fixing device (not shown), and an option controller 1118 for controlling options.

The image processor 1036, page memory 1038, printer controller 1039, image correction unit 1105, and laser driver 1113 are connected via an image data bus 1120.

Figure 3:
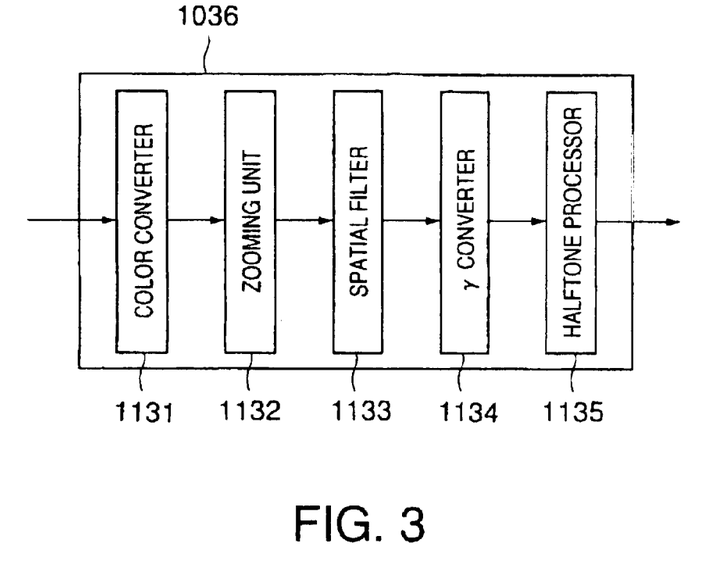
FIG. 3 is a block diagram showing the arrangement of an image processor included in the internal circuit.

The image processor 1036 executes color conversion, zooming, spatial filter processing, γ conversion, and halftone processing to convert R, G, and B image data into C, M and Y image data. As shown in FIG. 3, the image processor 1036 is made up of a color converter 1131, zooming unit 1132, spatial filter 1133, γ converter 1134, and halftone processor 1135.

R, G, and B image data output from the color scanner section 1001 are transferred to the color converter 1131 where they are converted into C, M, and Y image data. The image data output from the color converter 1131 undergo zooming processing by the zooming unit 1132, and spatial filter processing by the spatial filter 1133. After that, the image data undergo γ conversion processing by the γ converter 1134, and halftone processing by the halftone processor 1135, i.e., stable tone reproduction processing for high-density portions. Then, the image data are transferred to the color printer section 1002.

The γ converter 1134 corrects the y characteristic of the printer. In correction, the γ converter 1134 refers to γ tables set for respective C, M, Y, and K.

The halftone processor 1135 executes tone processing for an image signal, and converts the image signal into a printing device driving signal. The halftone processor 1135 performs quantization or image density conversion corresponding to the characteristics of a printing device for an input signal requested by the printing device so as not to degrade the tone of an image density signal.

The printing device driving signal is a laser driving pulse signal for a pulse width modulation printer, and contains information about a reference position and the length of a driving pulse for driving a printer laser modulator. The reference position represents which of the left end, right end, and center within the pixel is to be driven.

The printing device driving signal is also a laser driving pulse signal for a power modulation printer. In this case, the pulse width is always constant, and the energy intensity of a pulse defines the density level.

The color printer section 1002 forms a printing image in accordance with a printing device driving signal. When the printer section 1002 is of pulse width modulation type, the printing device driving signal is a driving pulse signal, and a laser is ON/OFF-controlled in accordance with the driving pulse.

Image processing apparatuses according to the first to fourth embodiments of the present invention applicable to the image processing apparatus having the above arrangement will be described with reference to the accompanying drawings.

Figure 4:
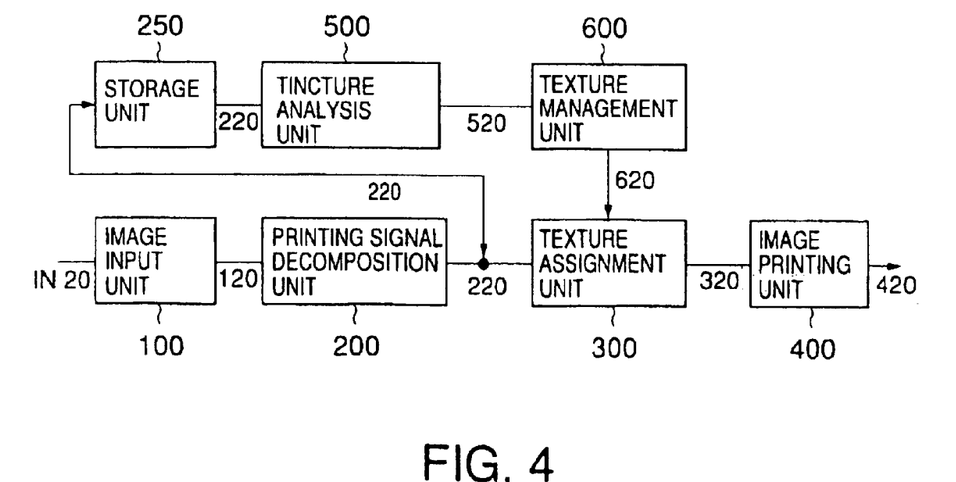
FIG. 4 is a block diagram showing the arrangement of an image processing apparatus according to the first embodiment of the present invention.

As shown in FIG. 4, an image processing apparatus according to the first embodiment of the present invention comprises an image input unit 100, printing signal decomposition unit 200, storage unit 250, tincture analysis unit 500, texture management unit 600, texture assignment unit 300, and image printing unit 400.

The image input unit 100 receives an input original IN20, optically reads it using, e.g., a photosensor, photoelectrically converts the read signal, and decomposes the signal into color ink signals. More specifically, the image input unit 100 outputs, e.g., R, G, and B signals 120 as tristimulus values.

The printing signal decomposition unit 200 receives the R, G, and B signals 120, converts them into, e.g., four C, M, Y, and K ink plate signals as a printing ink signal 220 using a known LUT (Look Up Table), Neugebauer equation, and the like, and outputs the printing ink signal 220.

The storage unit 250 receives and temporarily stores the printing ink signal 220. To reduce the storage capacity, the storage unit 250 may store R, G, and B signals or compressed signals as the printing ink signal 220.

The tincture analysis unit 500 receives the stored printing ink signal 220, decomposes it into ink signals of the respective colors, analyzes the tincture of the input original IN20, and determines the dominant priorities of the respective color ink signals. More specifically, the tincture analysis unit 500 analyzes the tincture for the respective ink colors using the printing ink signal 220, obtains the priorities of the respective ink plates, and outputs a priority signal 520.

The texture management unit 600 receives the priority signal 520, and outputs a texture parameter 620 of the respective ink plates. The texture parameter 620 assigns texture priorities to various printing textures.

The texture assignment unit 300 receives the texture parameter 620, performs texture generation processing for the respective ink plates, and outputs a texture image signal 320 in the CMYK format.

The storage unit 250 and texture assignment unit 300 can transmit/receive the printing ink signal 220 two ways. The texture assignment unit 300 can also receive the printing ink signal 220 stored in the storage unit 250 to output the texture image signal 320.

Even if a long time is taken to analyze the priorities of the respective ink plates in the tincture analysis unit 500 due to the transmission/reception of signals, an image is temporarily recorded in the storage unit 250, and no problem arises in image processing.

The image printing unit 400 prints an image on a printing medium based on the texture image signal 320, and outputs the image as a printed image 420.

In tincture analysis, an ink plate having a larger total ink amount can be regarded to be dominant. The total ink amount of each ink plate in each region (entire page or each block region) of interest is attained, and an ink plate having the largest total amount is regarded as a dominant ink plate in this region.

This will be expressed as an equation. Assume that the region of interest has N pixels i (i=1, 2, ..., N) from pixel 0 to pixel N (N is an integer of 1 or more). Let Yi, Mi, Ci, and Ki be pixel values at pixel i for the respective ink plates. Then, the total ink amounts of the respective ink plates are given by SUMc=ΣCi, SUMm=ΣMi, SUMy=ΣYi, SUMk=ΣKi SUMc, SUMm, SUMy, and SuMk are aligned in descending order of the value as the order of more dominant colors.

Depending on the original, a specific density is important on a granular surface. For example, on an original including a person, a specific density region of M is important for the flesh color.

In this case, the image processing apparatus can effectively use SUMc=ΣWci*Ci, SUMm=ΣWmi*Mi, SUMy=ΣWyi*Yi, and SUMk=ΣWki*Ki calculated by multiplying the respective ink densities by weights Wci, Wmi, Wyi, and Wki.

The first embodiment having the above arrangement can analyze the tincture of an input image, i.e., the dominant priorities of C, M, Y, and K, and assign stable, smooth textures in order from the most dominant ink plate, thereby realizing stable, smooth tone and color reproducibility.

A stable, smooth texture means a texture which is almost free from noise contained in an output, or is excellent in color reproducibility when a plurality of images are output.

As a method of obtaining such a texture, the density value of an output is measured using a densitometer or the like, and output values with respect to inputs are plotted on a graph. A texture in which a change in the density value of an output with respect to a change in input is small and stable corresponds to a stable, smooth texture.

Figure 5:
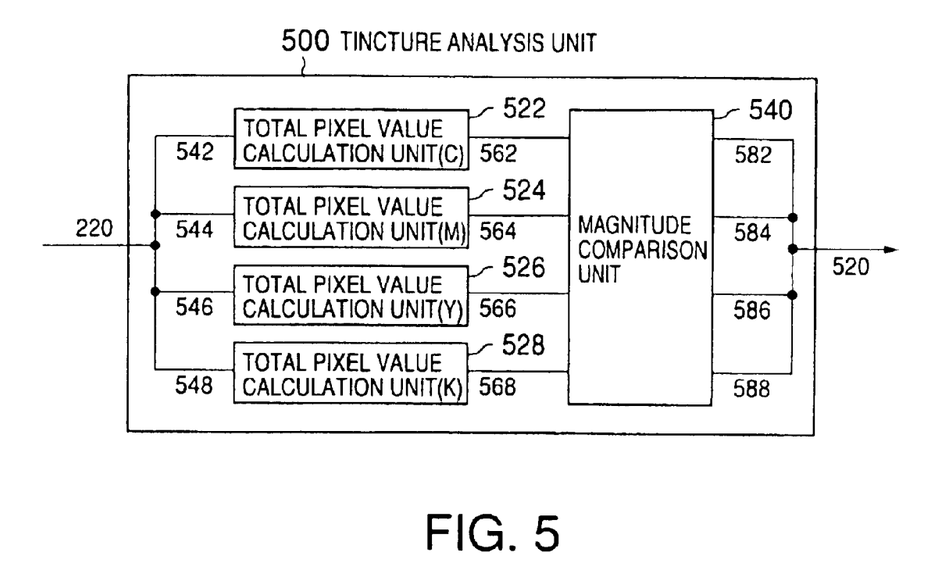
FIG. 5 is a block diagram showing the arrangement of a tincture analysis unit in the image processing apparatus of the first embodiment.

The detailed arrangement of the tincture analysis unit 500 will be explained with reference to FIG. 5.

The tincture analysis unit 500 comprises total pixel value calculation units 522, 524, 526, and 528 in correspondence with the respective C, M, Y, and K ink plates, and a magnitude comparison unit 540 for comparing their outputs.

The total pixel value calculation units 522, 524, 526, and 528 receive corresponding color plate ink signals 542, 544, 546, and 548 which are contained in the printing ink signal 220 and decomposed into signals of the respective ink plates. The total pixel value calculation units 522, 524, 526, and 528 calculate total ink amounts included in the corresponding ink plates, and output the total ink amounts as total ink signals 562, 564, 566, and 568.

The magnitude comparison unit 540 compares the total ink signals 562, 564, 566, and 568, sets ink priorities in descending order of the ink amount, and outputs ink priority signals 582, 584, 586, and 588.

The output ink priority signals 582, 584, 586, and 588 of the respective inks are output as one priority signal 520, which is input to the texture management unit 600.

Figure 6:
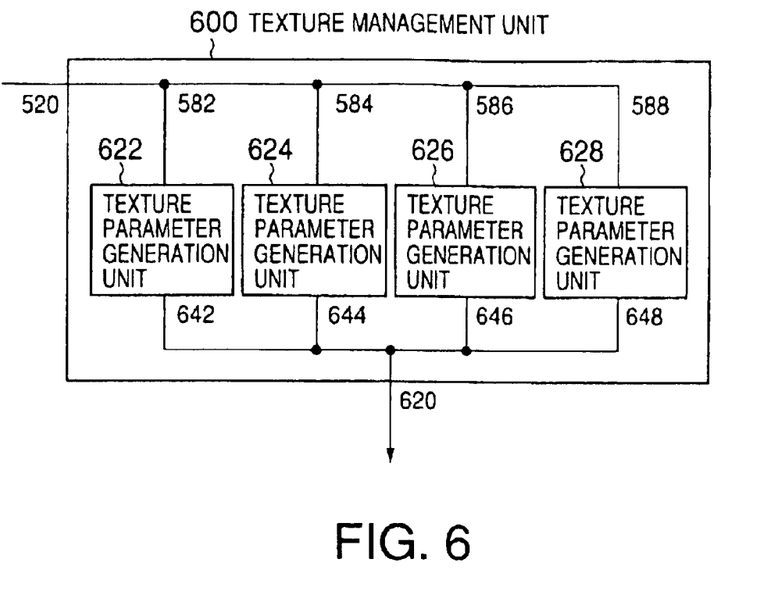
FIG. 6 is a block diagram showing the arrangement of a texture management unit in the image processing apparatus of the first embodiment.

The detailed arrangement of the texture management unit 600 will be explained with reference to FIG. 6.

The texture management unit 600 comprises texture parameter generation units 622, 624, 626, and 628 in correspondence with the respective ink plates. The texture parameter generation units 622, 624, 626, and 628 receive the corresponding ink priority signals 582, 584, 586, and 588 from the input priority signal 520, and output ink texture parameters 642, 644, 646, and 648. The ink texture parameters 642, 644, 646, and 648 are combined into one signal, and output as the texture parameter 620 to the texture assignment unit 300.

Figure 7:
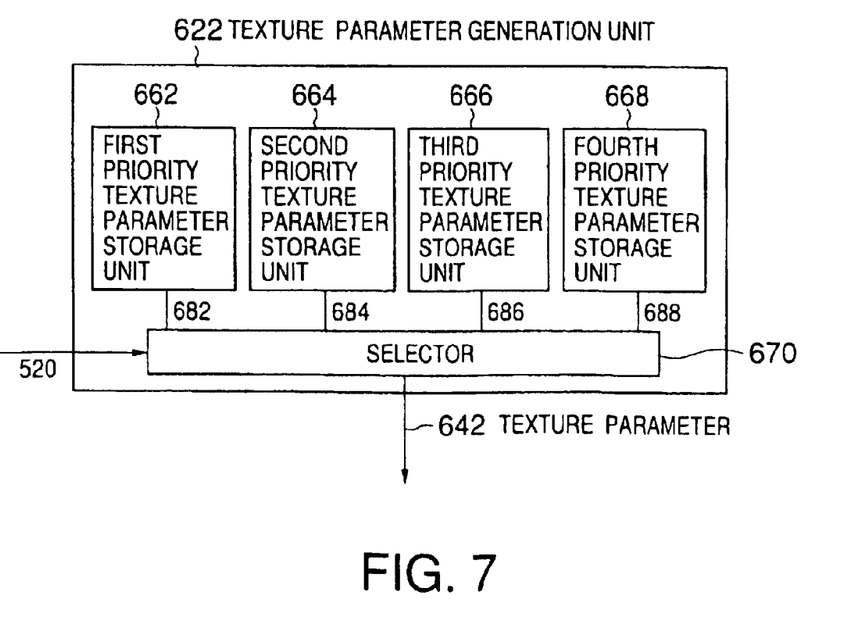
FIG. 7 is a block diagram showing the arrangement of a texture parameter generation unit in the texture management unit of the first embodiment.

The detailed arrangement of the texture parameter generation units 622, 624, 626, and 628 will be described with reference to FIG. 7 by exemplifying the texture parameter generation unit 622. The remaining texture parameter generation units 624, 626, and 628 have the same arrangement, and a description thereof will be omitted.

The texture parameter generation unit 622 has first, second, third, and fourth priority texture parameter storage units 662, 664, 666, and 668, and a selector 670.

The first, second, third, and fourth priority texture parameter storage units 662, 664, 666, and 668 store image processing parameters 682, 684, 686, and 688 corresponding to priorities. The selector 670 selects and outputs as the ink texture parameter 642 one of the image processing parameters 682, 684, 686, and 688 on the basis of the ink priority signal 520.

The image processing parameters 682, 684, 686, and 688 are various control values which shift pixel values to adjacent ones and are necessary in generating various textures such as vertical lines and modulation screen. These parameters are given in advance to the first, second, third, and fourth priority texture parameter storage units 662, 664, 666, and 668 where the parameters are stored.

Figure 8:
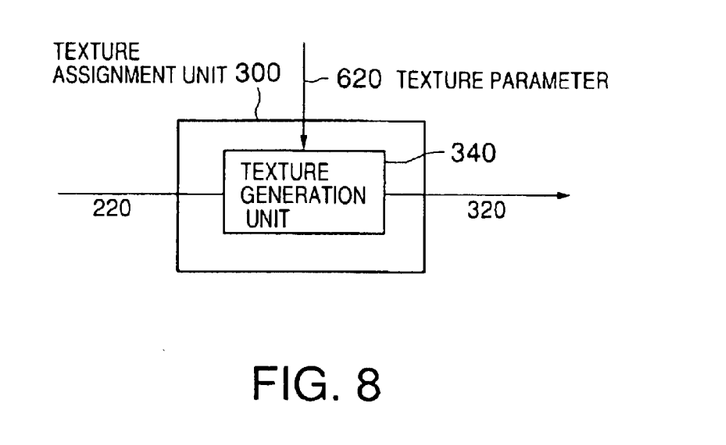
FIG. 8 is a block diagram showing the arrangement of a texture assignment unit in the image processing apparatus of the first embodiment.

FIG. 8 shows the arrangement of the texture assignment unit 300.

The texture assignment unit 300 comprises a texture generation unit 340. The texture generation unit 340 receives the texture parameter 620, and performs image processing for the printing ink signal 220 using either one of, e.g., dithering and line formation as a known method. The texture generation unit 340 outputs the obtained processing result as the texture image signal 320.

Figure 9:
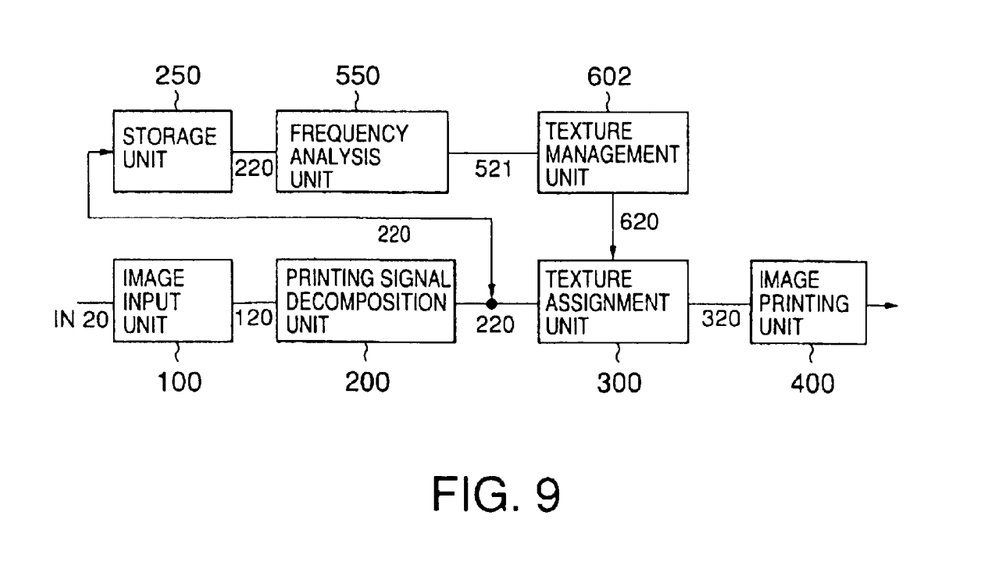
FIG. 9 is a block diagram showing the arrangement of an image processing apparatus according to the second embodiment of the present invention.

The second embodiment of the present invention will be described with reference to FIG. 9 showing the arrangement. The first embodiment is suitable in printing an input original not containing any dot information, like an output from a digital camera.

To the contrary, the second embodiment is suitable in copying and printing an input original having dot information, like a print.

An image processing apparatus according to the second embodiment comprises an image input unit 100, printing signal decomposition unit 200, storage unit 250, frequency analysis unit 550, texture assignment unit 300, texture management unit 602, and image printing unit 400.

Compared to the first embodiment, the second embodiment comprises the frequency analysis unit 550 instead of the tincture analysis unit 500. The tincture analysis unit 500 in the first embodiment receives the printing ink signal 220 to output the priority signal 520. To the contrary, the frequency analysis unit 550 in the second embodiment receives an identical printing ink signal 220, analyzes the frequency of a contained ink signal for each ink plate, analyzes a fundamental frequency in an input original IN20, and outputs a fundamental frequency*angle signal 521.

Compared to the texture management unit 600 in the first embodiment, the texture management unit 602 in the second embodiment receives a different signal, so that the texture management unit is denoted by the different reference numeral "602" in the second embodiment.

Figure 10:
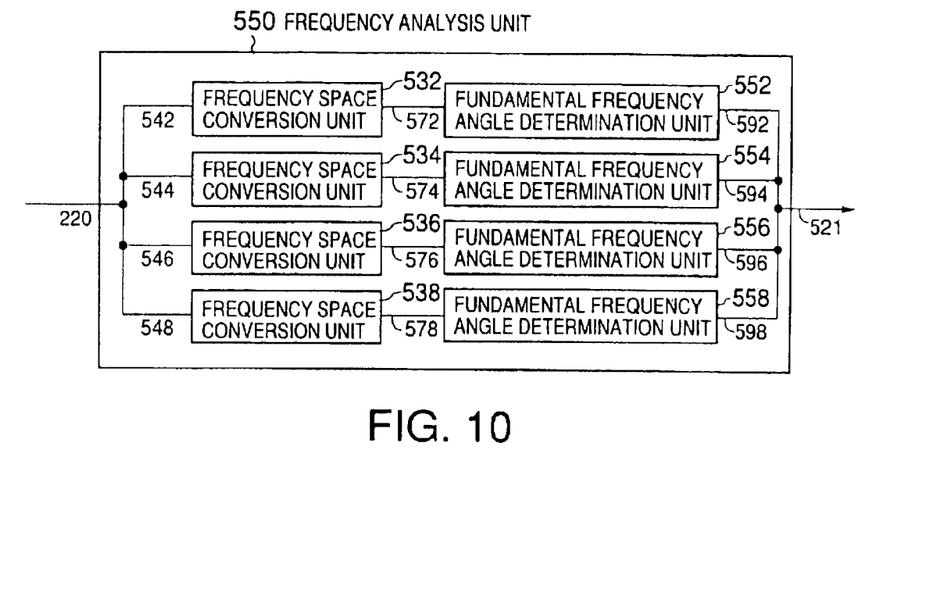
FIG. 10 is a block diagram showing the arrangement of a frequency analysis unit in the image processing apparatus of the second embodiment.

The detailed arrangement of the frequency analysis unit 550 will be explained with reference to FIG. 10. The frequency analysis unit 550 has frequency space conversion units 532, 534, 536, and 538, and fundamental frequency*angle determination units 552, 554, 556, and 558.

The frequency space conversion units 532, 534, 536, and 538 receive corresponding signals 542, 544, 546, and 548 of the printing ink signal 220 that are decomposed into corresponding ink plates. The frequency space conversion units 532, 534, 536, and 538 use known Fourier transformation or the like to convert the signals 542, 544, 546, and 548 into two-dimensional frequency space image signals 572, 574, 576, and 578.

The fundamental frequency*angle determination units 552, 554, 556, and 558 receive the corresponding two-dimensional frequency space image signals 572, 574, 576, and 578, and obtain two-dimensional frequency components having the maximum power except for DC components. The fundamental frequency*angle determination units 552, 554, 556, and 558 output, as pieces of ink frequency*angle information 592, 594, 596, and 598, these frequencies and angles calculated by the ratios of the horizontal and vertical components of the frequencies.

The pieces of ink frequency*angle information 592, 594, 596, and 598 are combined into one information, and output as the fundamental frequency*angle signal 521.

In frequency analysis, Fourier analysis is generally the simplest analysis with high precision. As an effective method, each region (entire page or each block region) is Fourier-transformed to attain a two-dimensional frequency component, and a frequency having the maximum power except for a DC component is set as a fundamental frequency component.

If texture angles are independently calculated for the respective colors using the fundamental frequency components of the respective colors, a plurality of color plates may use the same texture angle. This situation can be avoided by using pieces of fundamental frequency information of the four colors as addresses and obtaining texture angles from the LUT for outputting pieces of texture angle information of the four colors.

Figure 11:
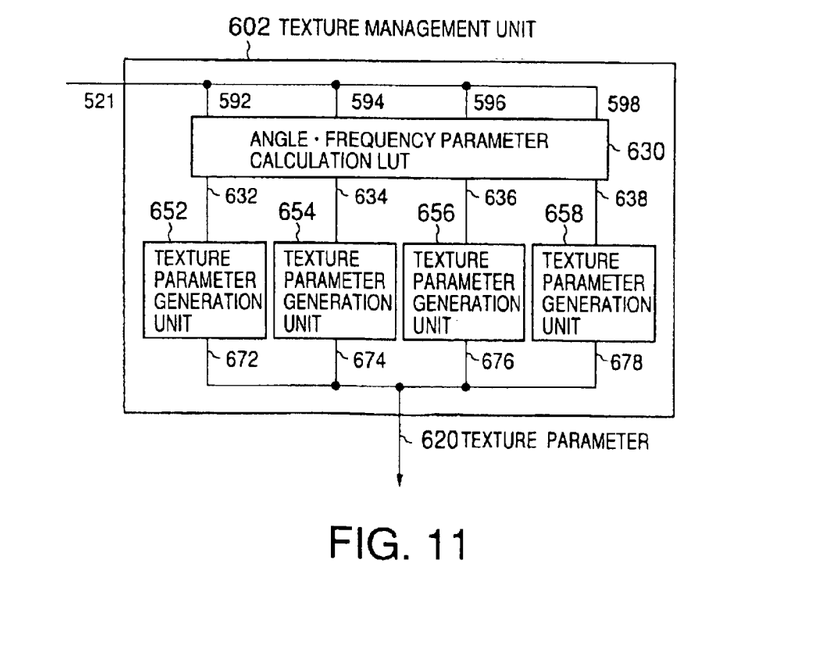
FIG. 11 is a block diagram showing the arrangement of a texture management unit in the image processing apparatus of the second embodiment.

The texture management unit 602 will be explained with reference to FIG. 11 showing the arrangement.

The texture management unit 602 has an angle*frequency parameter calculation LUT 630, and texture parameter generation units 652, 654, 656, and 658 corresponding to the respective output plates.

The angle*frequency parameter calculation LUT 630 uses the pieces of ink frequency*angle information 592, 594, 596, and 598 as addresses to output pieces of texture frequency*angle information 632, 634, 636, and 638 for the respective ink plates. In this case, the pieces of information 632, 634, 636, and 638 are generated not independently for the four colors but in conjunction with the four colors. This can avoid any situation in which a plurality of ink plates use textures having the same angle and frequency.

The texture parameter generation units 652, 654, 656, and 658 receive the corresponding pieces of texture frequency*angle information 632, 634, 636, and 638, and output ink texture parameters 672, 674, 676, and 678. The ink texture parameters 672, 674, 676, and 678 are combined into one parameter, and output as a texture parameter 620.

Figure 12:
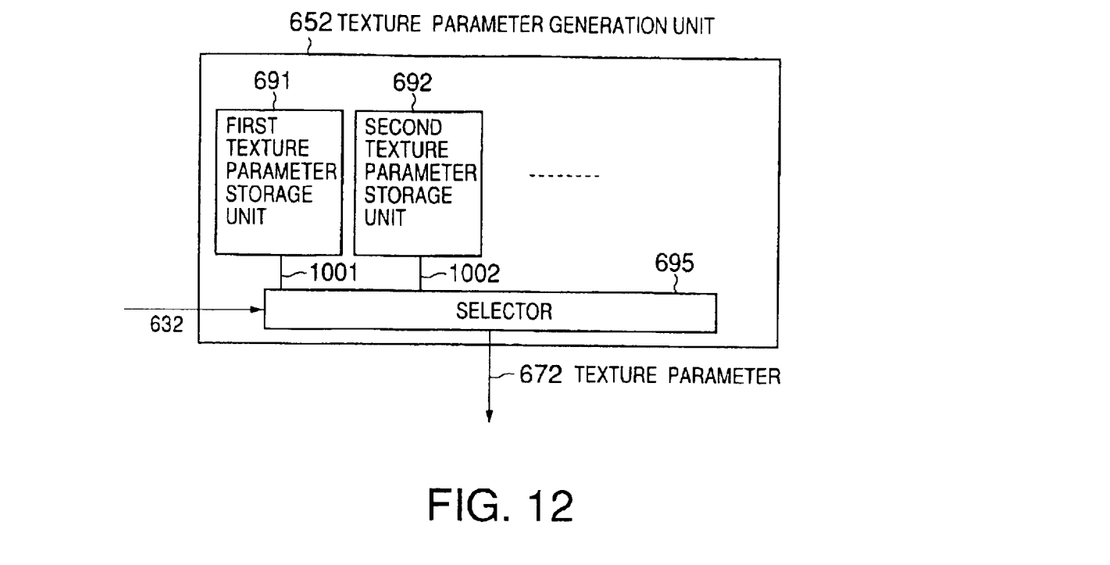
FIG. 12 is a block diagram showing the arrangement of a texture parameter generation unit in the texture management unit of the second embodiment.

Of the texture parameter generation units 652, 654, 656, and 658, for example, the generation unit 652 has the arrangement shown in FIG. 12. The remaining generation units 654, 656, and 658 also have the same arrangement, and a description thereof will be omitted.

The texture parameter generation unit 652 comprises first, second, . . . , Nth texture parameter storage units 691, 692, . . . , 69N (N is an integer of 1 or more), and a selector 695.

The first, second, . . . , Nth texture parameter storage units 691, 692, . . . , 69N output texture parameters 1001, 1002, . . . , 100N. The selector 695 selects one of the texture parameters 1001, 1002, . . . , 100N in accordance with the texture frequency*angle information 632, and outputs the selected parameter as the ink texture parameter 672. In this case, the number N is a value corresponding to the dynamic range of the texture frequency*angle information 632 equivalent to, e.g., a selector address signal.

Figure 13:
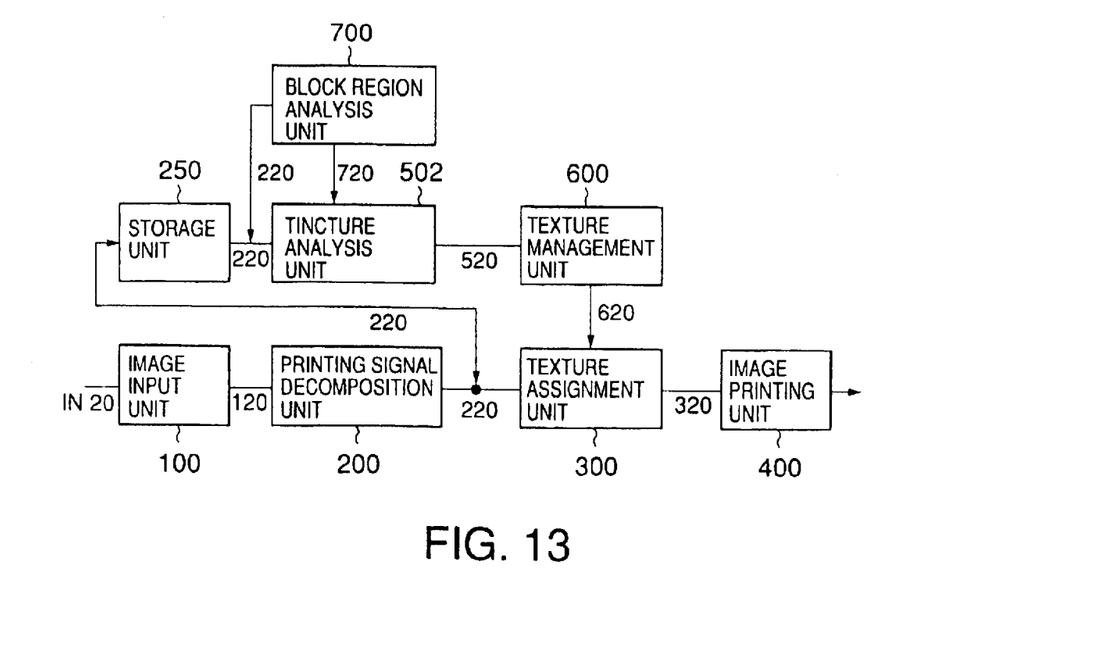
FIG. 13 is a block diagram showing the arrangement of an image processing apparatus according to the third embodiment of the present invention.

An image processing apparatus according to the third embodiment of the present invention will be described with reference to FIG. 13.

The image processing apparatus according to the third embodiment comprises an image input unit 100, printing signal decomposition unit 200, storage unit 250, tincture analysis unit 502, block region analysis unit 700, texture assignment unit 300, texture management unit 600, and image printing unit 400.

The third embodiment is different from the first embodiment in the block region analysis unit 700. The block region analysis unit 700 analyzes the structure of an original from an input printing ink signal 220 for each block, and outputs the analyzed structure as a block information signal 720 to the tincture analysis unit 502.

When a plurality of photographs or charts are on the same page of an original, a method of determining the tincture for each block is effective. For this reason, the third embodiment adopts the block region analysis unit 700.

Figure 14:
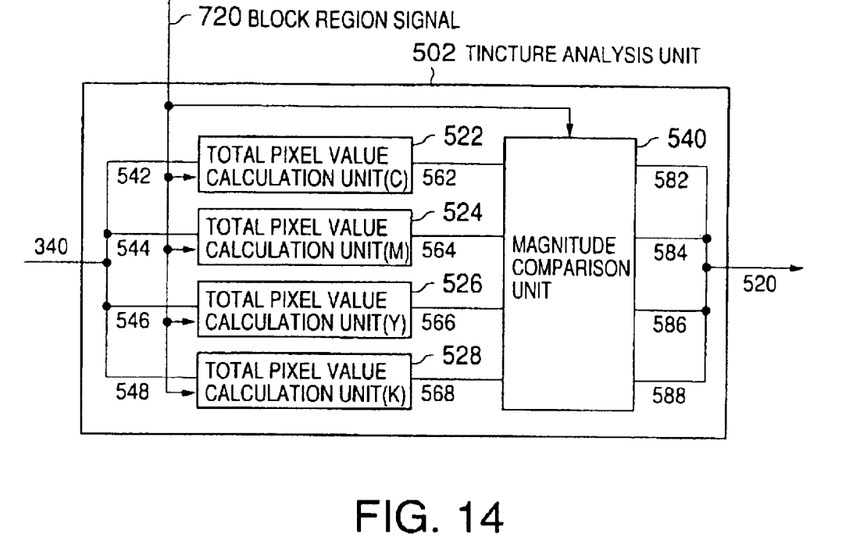
FIG. 14 is a block diagram showing the arrangement of a tincture analysis unit in the image processing apparatus of the third embodiment.

FIG. 14 shows the arrangement of the tincture analysis unit 502 in the third embodiment. The tincture analysis unit 502 has total pixel value calculation units 522, 524, 526, and 528 corresponding to the respective plates, and a magnitude comparison unit 540.

The total pixel value calculation units 522, 524, 526, and 528 receive corresponding color plate ink signals 542, 544, 546, and 548 which are contained in a printing ink signal 220 and decomposed into signals of the respective ink plates. The total pixel value calculation units 522, 524, 526, and 528 generate the total ink amounts of the respective plates contained in a specific page, and output the total ink amounts as total ink signals 562, 564, 566, and 568.

At this time, the total pixel value calculation units 522, 524, 526, and 528 receive the block region signal 720 output from the block region analysis unit 700, and calculate the total ink signals 562, 564, 566, and 568 for each block. The magnitude comparison unit 540 compares the magnitudes of the total ink signals 562, 564, 566, and 568, and assigns ink priority signals 582, 584, 586, and 588 in descending order of the priority to the total ink signals 562, 564, 566, and 568 in descending order of the value.

The magnitude comparison unit 540 also receives the block information signal 720, and obtains ink priority signals 582, 584, 586, and 588 for each block. The ink priority signals 582, 584, 586, and 588 are combined into one signal, and output as a priority signal 520.

Figure 15:
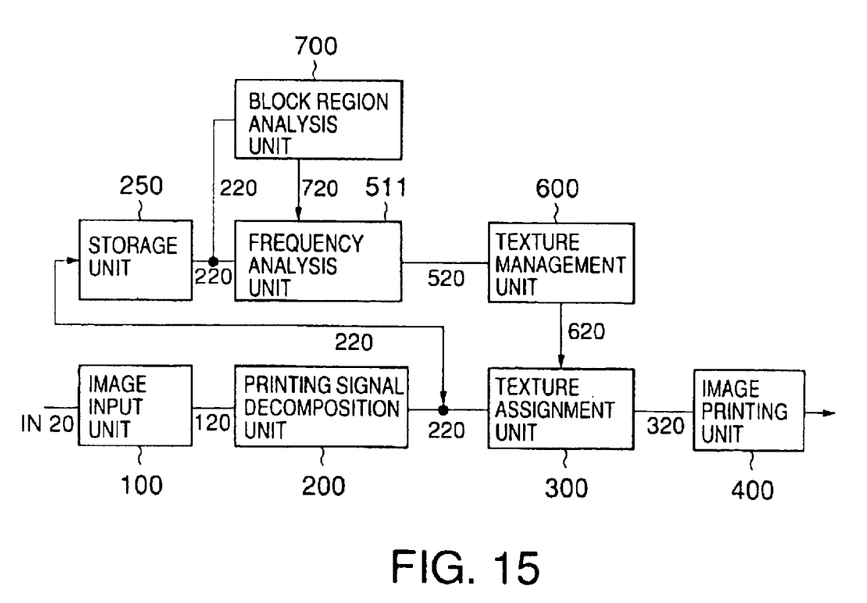
FIG. 15 is a block diagram showing the arrangement of an image processing apparatus according to the fourth embodiment of the present invention.

An image processing apparatus according to the fourth embodiment of the present invention will be described with reference to FIG. 15.

Similar to the third embodiment, an image printing apparatus of the present invention analyzes each block. The contents of the analysis are the same as in the second embodiment. The fourth embodiment is more effective when, e.g., an input original is a print having dot information. When photographs or charts having different frequencies and angles are on in a single page of an original, the fourth embodiment determines the frequency and angle of the original for each block, and decomposes an input image signal into color ink signals.

Unlike the second embodiment, the fourth embodiment employs a block region analysis unit 700. The block region analysis unit 700 analyzes the structure of an input original IN20 from a printing ink signal 220, and outputs the analyzed result as a block region signal 720 to a frequency analysis unit 511.

Figure 16:
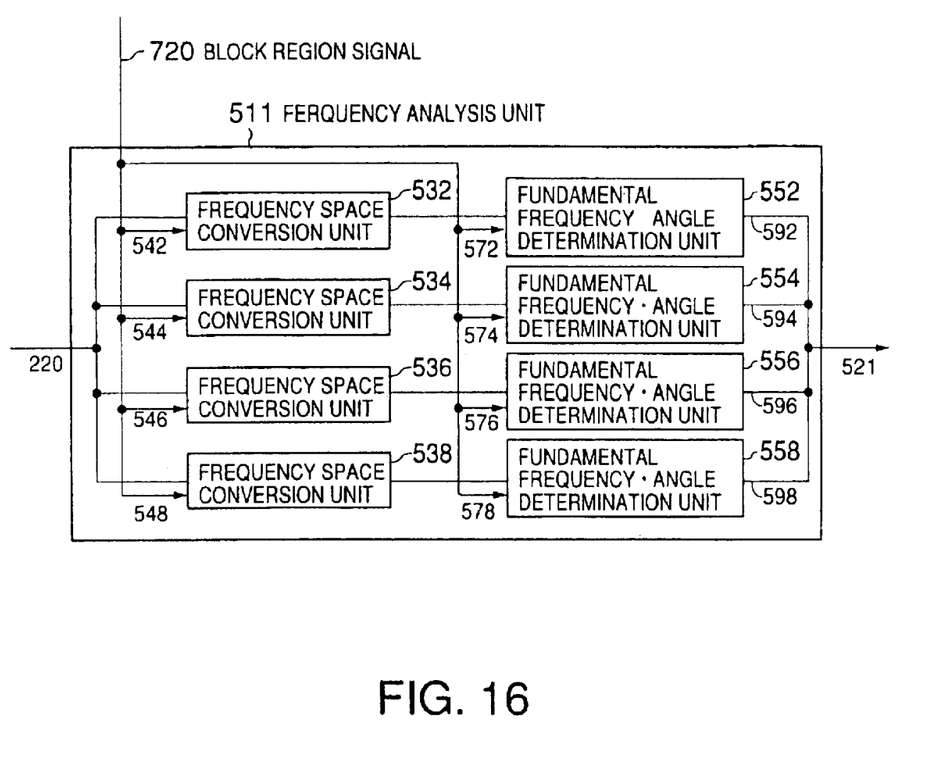
FIG. 16 is a block diagram showing the arrangement of a frequency analysis unit in the image processing apparatus of the fourth embodiment.

FIG. 16 shows the arrangement of the frequency analysis unit 511 in the fourth embodiment.

The frequency analysis unit 511 has frequency space conversion units 532, 534, 536, and 538, and fundamental frequency·angle determination units 552, 554, 556, and 558.

The frequency space conversion units 532, 534, 536, and 538 receive corresponding signals 542, 544, 546, and 548 which are contained in the printing ink signal 220 and decomposed into signals of the respective ink plates, and convert the signals 542, 544, 546, and 548 into two-dimensional frequency space image signals 572, 574, 576, and 578 using known Fourier transformation or the like.

At this time, the frequency space conversion units 532, 534, 536, and 538 convert the signals into the two-dimensional frequency space image signals 572, 574, 576, and 578 for each block on the basis of the block region signal 720.

The fundamental frequency-angle determination units 552, 554, 556, and 558 receive the corresponding two-dimensional frequency space image signals 572, 574, 576, and 578, and obtain two-dimensional frequency components having the maximum power except for DC components. The fundamental frequency-angle determination units 552, 554, 556, and 558 output, as pieces of ink frequency-angle information 592, 594, 596, and 598, these frequencies and angles calculated by the ratios of the horizontal and vertical components of the frequencies.

At this time, the fundamental frequency-angle determination units 552, 554, 556, and 558 obtain the pieces of ink frequency-angle information 592, 594, 596, and 598 for each block in accordance with the block region signal 720.

The pieces of ink frequency-angle information 592, 594, 596, and 598 are combined into one information, and output as a fundamental frequency-angle signal 521.

The above-described embodiments are merely examples, and do not limit the present invention. For example, the arrangements of the tincture analysis unit, texture management unit, texture parameter generation unit, and texture assignment unit are not limited to the ones shown in FIGS. 5, 6, 7, and 8, and can be modified as needed.

What is claimed is:

1. An image processing apparatus comprising:
 a printing signal decomposition unit for receiving an input image signal and decomposing the input image signal into a plurality of color ink signals;
 a tincture analysis unit for analyzing a tincture of the input image using the color ink signals, determining dominant priorities of the color ink signals, and outputting ink priority signals;
 a texture management unit for assigning texture priorities to a plurality of printing textures in accordance with the ink priority signals; and
 a texture assignment unit for assigning the printing textures in descending order of the texture priorities to the color ink signals in descending order of the dominant priorities.

2. An apparatus according to claim 1, wherein
 said apparatus further comprises block division means for dividing the input image signal into a plurality of block regions for each page, and
 said tincture analysis unit analyzes the tincture of the input image for each divided block.

3. An apparatus according to claim 1, wherein said tincture analysis unit obtains sums of the respective color ink signals contained in the input image, and assigns higher dominant priorities to the color ink signals in descending order of the sums.

4. An apparatus according to claim 1, wherein said tincture analysis unit obtains first sums of the respective color ink signals contained in the input image, obtains second sums calculated by multiplying the first sums by weighting coefficients corresponding to the color ink signals, and assigns higher dominant priorities to the color ink signals in descending order of the second sums.

5. An apparatus according to claim 1, wherein said tincture analysis unit comprises:
 a plurality of total pixel value calculation units which are arranged for the respective color ink signals, and receive the corresponding color ink signals contained in the input image signal to obtain total color ink amounts; and
 a magnitude comparison unit for comparing the total color ink amounts obtained by said total pixel value calculation units, and outputting the ink priority signals on the basis of a comparison result.

6. An apparatus according to claim 1, wherein said texture management unit sets a texture having the highest priority as a vertical line.

7. An apparatus according to claim 1, wherein said texture management unit comprises a plurality of texture parameter generation units which are arranged for the respective color ink signals, and generate texture parameters of the corresponding color ink signals in accordance with the ink priority signals of the corresponding color ink signals.

8. An apparatus according to claim 7, wherein each texture parameter generation unit comprises:
 n (n is an integer of not less than 2) priority texture parameter storage units for storing in advance and outputting image processing parameters for n priorities; and
 a selector for selecting any one of the image processing parameters output from said priority texture parameter storage units in accordance with the ink priority signals, and outputting the selected image processing parameter as the texture parameter.

9. An apparatus according to claim 7, wherein said texture assignment unit receives the color ink signals and the texture parameters, performs image processing for the color ink signals using the texture parameters, and assigns the printing textures in descending order of the texture priories to the color ink signals in descending order of the dominant priorities.

10. An image processing method comprising the steps of:
 receiving an input image signal and decomposing the input image signal into a plurality of color ink signals;
 analyzing a tincture of the input image using the color ink signals, determining dominant priorities of the color ink signals, and generating ink priority signals;
 assigning texture priorities to a plurality of printing textures in accordance with the ink priority signals; and
 assigning the printing textures in descending order of the texture priorities to the color ink signals in descending order of the dominant priorities.

11. A method according to claim 10, wherein
 the method further comprises the step of dividing the input image signal into a plurality of block regions for each page, and
 the step of analyzing the tincture of the input image comprises performing the analysis for each divided block.

12. A method according to claim 10, wherein the step of analyzing the tincture of the input image comprises obtaining sums of the respective color ink signals contained in the input image signal, and assigning higher dominant priorities to the color ink signals in descending order of the sums.

13. A method according to claim 10, wherein the step of analyzing the tincture of the input image comprises obtaining first sums of the respective color ink signals contained in the input image signal, obtaining second sums calculated by multiplying the first sums by weighting coefficients corresponding to the color ink signals, and assigning higher dominant priorities to the color ink signals in descending order of the second sums.

14. A method according to claim 10, wherein the step of analyzing the tincture of the input image comprises:

receiving the corresponding color ink signals contained in the input image signal, and obtaining total color ink amounts; and comparing the total color ink amounts, and generating the ink priority signals on the basis of a comparison result.

15. A method according to claim 10, wherein the step of assigning the texture priorities comprises setting a texture having the highest priority as a vertical line.

16. A method according to claim 10, wherein the step of assigning the texture priorities comprises generating texture parameters of the corresponding color ink signals in accordance with the ink priority signals of the corresponding color ink signals.

17. A method according to claim 16, wherein the step of generating the texture parameters comprises the steps of:

storing in advance and outputting image processing parameters for n priorities; and selecting any one of the image processing parameters in accordance with the ink priority signals, and outputting the selected image processing parameter as the texture parameter.

18. A method according to claim 16, wherein the step of assigning the printing textures to the color ink signals comprises receiving the color ink signals and the texture parameters, performing image processing for the color ink signals using the texture parameters, and assigning the printing textures in descending order of the texture priories to the color ink signals in descending order of the dominant priorities.

* * * * *